(12) United States Patent
Okada et al.

(10) Patent No.: US 9,654,661 B1
(45) Date of Patent: May 16, 2017

(54) IMAGE SCANNING DEVICE AND METHOD, IMAGE READING APPARATUS, AND NON-TRANSITORY COMPUTER READABLE MEDIUM THAT SET A SCANNING AREA BASED ON A DETECTED LOCATION OF A CODE IMAGE

(71) Applicant: FUJI XEROX CO., LTD., Tokyo (JP)

(72) Inventors: Shigeru Okada, Kanagawa (JP); Katsuya Koyanagi, Kanagawa (JP); Kunihiko Kobayashi, Kanagawa (JP); Shintaro Adachi, Kanagawa (JP); Hiroyuki Kishimoto, Kanagawa (JP); Akane Yoshizaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/097,552

(22) Filed: Apr. 13, 2016

(30) Foreign Application Priority Data

Dec. 22, 2015 (JP) ................................. 2015-249540

(51) Int. Cl.
| H04N 1/04 | (2006.01) |
| H04N 1/00 | (2006.01) |
| H04N 1/32 | (2006.01) |
| G06K 9/20 | (2006.01) |
| G06K 19/06 | (2006.01) |

(52) U.S. Cl.
CPC ............. *H04N 1/04* (2013.01); *G06K 9/2063* (2013.01); *G06K 19/06037* (2013.01); *H04N 1/00326* (2013.01); *H04N 1/00328* (2013.01); *H04N 1/00334* (2013.01); *H04N 1/00355* (2013.01); *H04N 1/00358* (2013.01); *H04N 1/00363* (2013.01); *H04N 1/00368* (2013.01); *H04N 1/00371* (2013.01); *H04N 1/00374* (2013.01); *H04N 1/00376* (2013.01); *H04N 1/00379* (2013.01); *H04N 1/32101* (2013.01); *H04N 1/32128* (2013.01); *H04N 1/32133* (2013.01); *H04N 1/32144* (2013.01); *H04N 1/32149* (2013.01); *H04N 1/32352* (2013.01)

(58) Field of Classification Search
None
See application file for complete search history.

(56) References Cited

U.S. PATENT DOCUMENTS

| 5,237,156 A * | 8/1993 | Konishi ............ G06F 17/30253 235/375 |
| 6,360,001 B1 * | 3/2002 | Berger ................. G06K 9/2054 382/101 |
| 7,523,864 B2 * | 4/2009 | Manheim ........... G06K 7/10861 235/375 |

(Continued)

FOREIGN PATENT DOCUMENTS

JP 2008-186399 A 8/2008

*Primary Examiner* — Scott A Rogers
(74) *Attorney, Agent, or Firm* — Oliff PLC

(57) ABSTRACT

An image scanning device includes a detector and a setter. The detector scans an image in units of pages, and detects a code image included in the image in units of pages. When the detector detects the code image on one page and then detects the code image on another page, the setter sets a scanning area on a subsequent page following the other page in accordance with a position of the code image detected on the one page and a position of the code image detected on the other page.

12 Claims, 8 Drawing Sheets

(56) References Cited

U.S. PATENT DOCUMENTS

| | | | | |
|---|---|---|---|---|
| 8,019,113 B2* | 9/2011 | Goda | ................ | G06K 9/00577 |
| | | | | 283/68 |
| 8,061,615 B2* | 11/2011 | Yada | ....................... | G06K 7/14 |
| | | | | 235/462.08 |
| 8,314,964 B2* | 11/2012 | Tokumaru | .......... | H04N 1/00217 |
| | | | | 358/1.13 |
| 8,762,828 B2* | 6/2014 | Le Henaff | ............. | G06F 17/211 |
| | | | | 715/211 |
| 8,814,047 B2* | 8/2014 | Lee | .................... | G06K 7/10861 |
| | | | | 235/462.08 |
| 2007/0140568 A1* | 6/2007 | Kohtani | ............ | G06F 17/30253 |
| | | | | 382/229 |
| 2010/0177970 A1* | 7/2010 | King | .................... | G06F 17/218 |
| | | | | 382/229 |

* cited by examiner

US 9,654,661 B1

IMAGE SCANNING DEVICE AND METHOD, IMAGE READING APPARATUS, AND NON-TRANSITORY COMPUTER READABLE MEDIUM THAT SET A SCANNING AREA BASED ON A DETECTED LOCATION OF A CODE IMAGE

CROSS-REFERENCE TO RELATED APPLICATIONS

This application is based on and claims priority under 35 USC 119 from Japanese Patent Application No. 2015-249540 filed Dec. 22, 2015.

BACKGROUND (i) Technical Field

The present invention relates to an image scanning device and method, an image reading apparatus, and a non-transitory computer readable medium.

(ii) Related Art

An image obtained by an image reading apparatus or the like may sometimes include a code image. The code image is detectable by scanning the whole area of the image, for example. When the image ranges over multiple pages, if the whole area of the image is scanned, it takes time to detect the code image.

SUMMARY

According to an aspect of the invention, there is provided an image scanning device including a detector and a setter. The detector scans an image in units of pages, and detects a code image included in the image in units of pages. When the detector detects the code image on one page and then detects the code image on another page, the setter sets a scanning area on a subsequent page following the other page in accordance with a position of the code image detected on the one page and a position of the code image detected on the other page.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the accompanying drawings.

Figure 1:
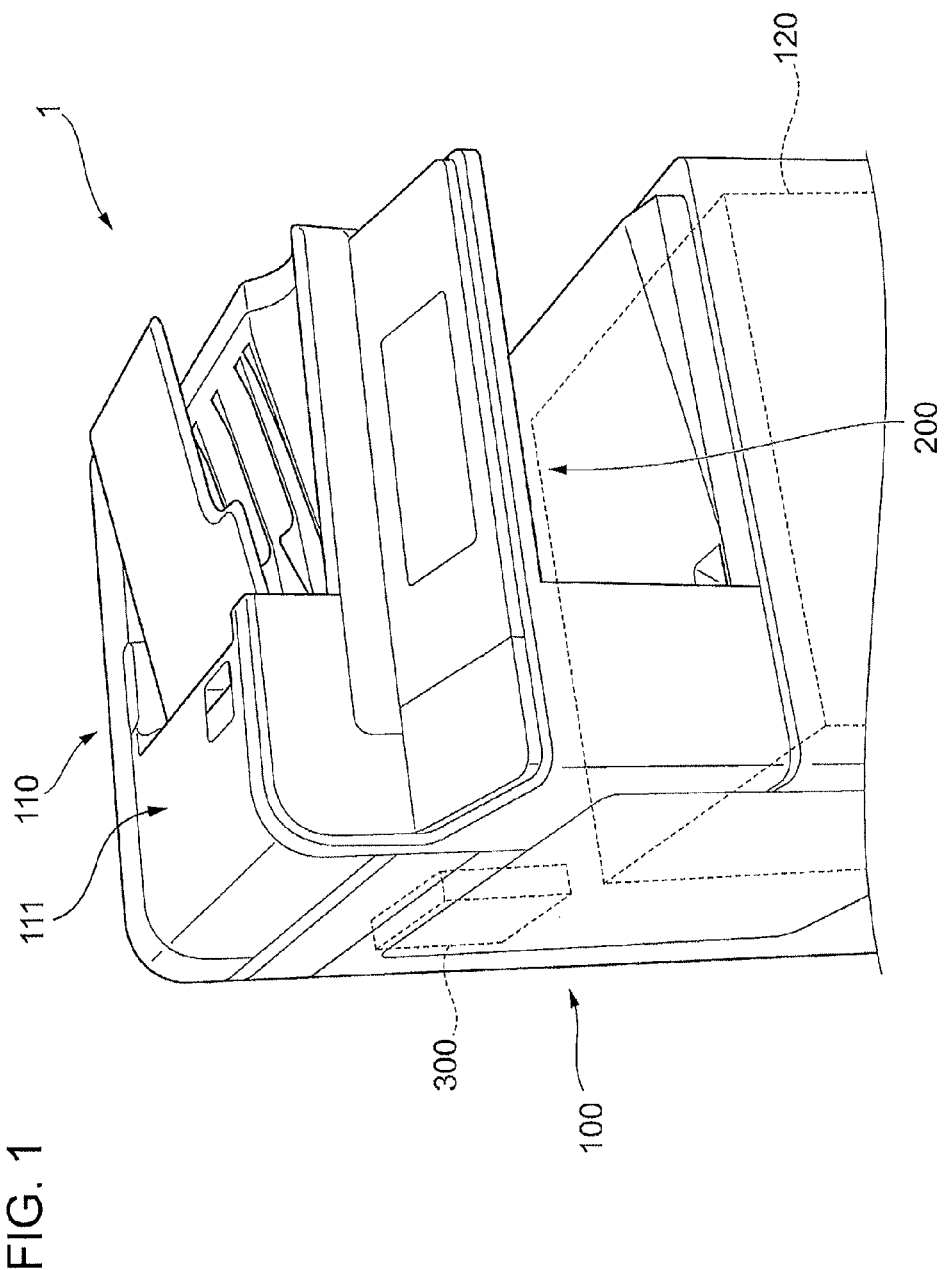
FIG. 1 illustrates an image forming apparatus according to an exemplary embodiment.

FIG. 1 is a diagram illustrating an image forming apparatus 1 according to the exemplary embodiment.

The image forming apparatus 1 according to the exemplary embodiment includes an apparatus body 100, and a scanner device 110 serving as an example of an image reading unit that reads an image on a document. The image forming apparatus 1 further includes a controller 300 that controls each unit of the image forming apparatus 1, and a display mechanism 200 that displays information for a user.

The apparatus body 100 contains an image forming mechanism 120 that forms an image on paper serving as an example of a recording material.

The image forming mechanism 120 forms an image on paper by using the so-called electrophotographic system. The image forming system to be used is not limited to the electrophotographic system, and the image forming mechanism 120 may use other systems such as inkjet printing.

The scanner device 110 is provided with a document plate (not illustrated) on which a document is placed, and the document plate is made of transparent glass. An image reading unit (not illustrated) that reads an image of a document on the document plate is provided under the document plate. The image reading unit is provided with a charge-coupled device (CCD) image sensor. Furthermore, a document feeder 111 that feeds a document to the document plate is provided above the document plate.

Figure 2:
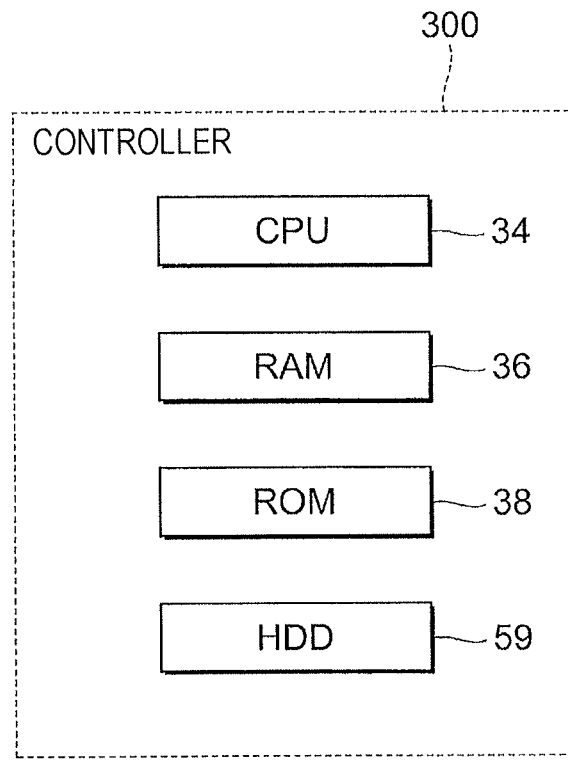
FIG. 2 illustrates an exemplary hardware configuration of a controller.

FIG. 2 illustrates an exemplary hardware configuration of the controller 300.

The controller 300 includes a central processing unit (CPU) 34, a random-access memory (RAM) 36, a read-only memory (ROM) 38, and a hard disk drive (HDD) 59.

The CPU 34 executes a process while exchanging data with the RAM 36 in accordance with a program stored in the ROM 38 or the HDD 59.

Figure 3:
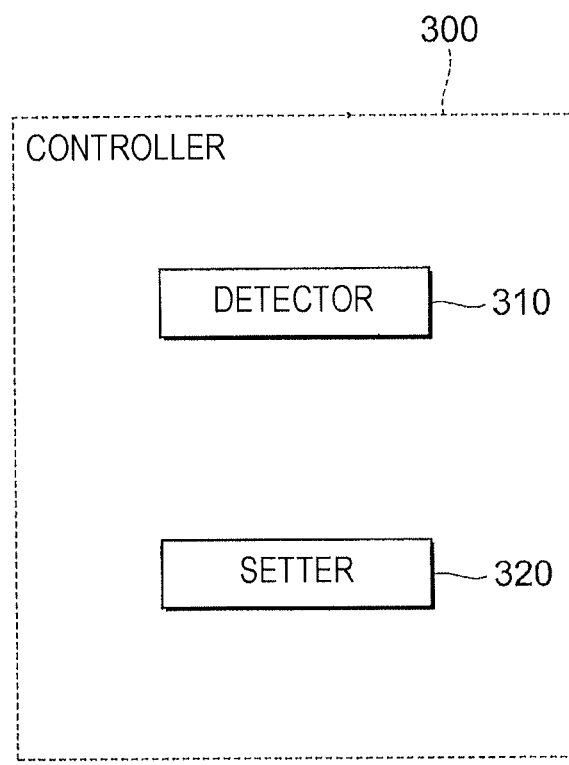
FIG. 3 is a functional block diagram of the controller.

FIG. 3 is a functional block diagram of the controller 300. This functional block diagram only illustrates functional blocks related to image scanning.

The controller 300 according to the exemplary embodiment functions as a detector 310 and a setter 320 when the CPU 34 executes a program stored in the ROM 38 or the HDD 59.

In other words, a program for implementing the functions of the detector 310 and the setter 320 is loaded from a memory such as the ROM 38 to the RAM 36 in the exemplary embodiment. In accordance with the program loaded to the RAM 36, the CPU 34 performs a process.

The form of providing the above-mentioned program, executed by the CPU 34, includes the form of providing the program by loading from a storage medium such as a digital versatile disc (DVD)-ROM to the RAM 36. Another form is the form of providing the program by installing the program in advance in the ROM 38. Another form is the form of transmitting the program via a network such as the Internet to the image forming apparatus 1.

The detector 310 serving as an example of a detector scans (analyses) an image (image data) obtained by reading a document with the use of the scanner device 110 (see FIG. 1), and detects a code image in the image. Code image detection is performed using the related art, such as pattern patching.

The detector 310 scans the image in units of pages, and detects a code image included in the image in units of pages.

The controller 300 includes the setter 320 serving as an example of a setter. The setter 320 sets a scanning area for scanning the image with the use of the detector 310. In other words, the setter 320 sets a scanning area for identifying which region of each page is to be scanned.

A portion where the detector 310 and the setter 320 are provided may be regarded as an image scanning device that scans an image (code image). The image forming apparatus 1 according to the exemplary embodiment has a configuration that includes an image reading apparatus. The image reading apparatus includes the scanner device 110 and the controller 300.

Figure 4:
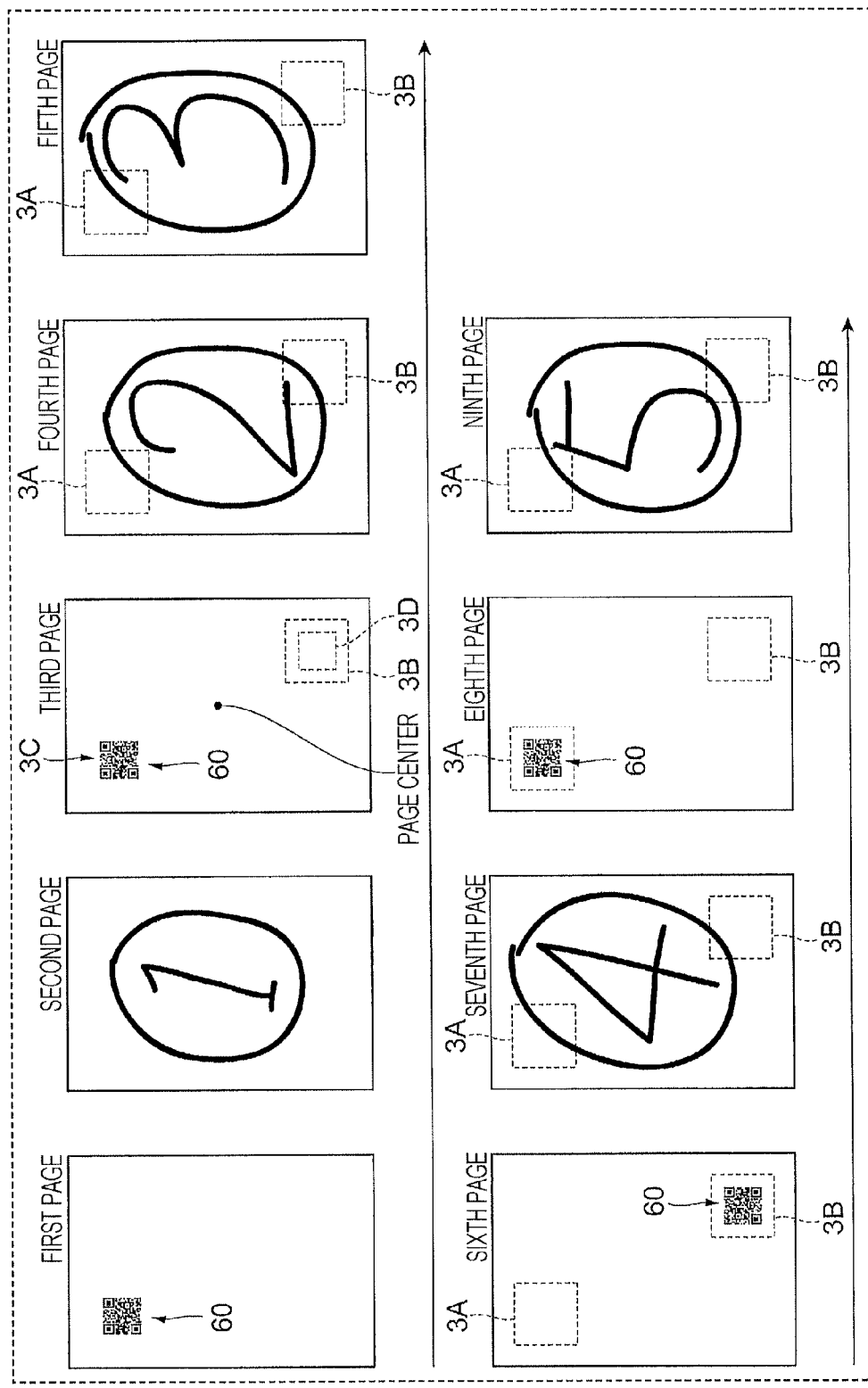
FIG. 4 is a diagram illustrating an exemplary process executed by the controller with regard to code image detection.

FIG. 4 is a diagram illustrating an exemplary process executed by the controller 300 with regard to code image detection.

In this exemplary process, a process of scanning an image obtained by reading, with the use of the scanner device 110, a document including paper added with a code image (hereinafter referred to as "code image added paper") will be described by way of example.

FIG. 4 illustrates an image (image data) of a nine-page document. Images of the first, third, sixth, and eighth pages are images obtained by reading the code image added paper. These images include a code image 60.

The other images (images of the second, fourth, fifth, seventh, and ninth pages) are images obtained by reading paper other than the code image added paper. The images of the second, fourth, fifth, seventh, and ninth pages include images of numerals, and images of circles surrounding these numerals.

The code image 60 contains, for example, an information transmission address, such as an email address. In this case, an image obtained by the scanner device 110 may be transmitted to this transmission address.

The code image 60 additionally contains, for example, information that gives instructions for dividing the image. In this case, the image is divided at the code image added paper serving as a boundary, for example, thereby dividing the image of one document into plural images.

The code image 60 may be added to a document by preparing a slip sheet to be inserted into a document that the user wants to scan, and adding the code image 60 to this slip sheet. Alternatively, the code image 60 may be added to a to-be-scanned document itself.

Although the following description will discuss the case of using a two-dimensional barcode such as a Quick Response (QR) code as the code image 60, the code image 60 is not limited to a two-dimensional barcode, and the code image 60 may be a one-dimensional barcode or another existing code image.

In the exemplary embodiment, the detector 310 first scans the image of the first page, and determines whether the image of the first page includes the code image 60.

When the image includes the code image 60, the detector 310 detects the number of code images 60, and the position of each code image 60.

More specifically, the detector 310 first scans the whole image of the first page, and determines whether the image of the first page includes the code image 60.

When the image includes the code image 60, the detector 310 detects the number of code images 60, and the position of each code image 60.

In the example illustrated in FIG. 4, the image of the first page includes one code image 60. The detector 310 determines that the image of the first page includes the code image 60. In addition, the detector 310 detects the number of code images 60 (one in this example), and the position of each code image 60.

Next, the detector 310 scans the image of the second page, and determines whether the image of the second page includes the code image 60.

The image of the second page includes no code image 60 in this example. For the image of the second page, the detector 310 performs no detection of the code image 60.

Next, the detector 310 scans the image of the third page, and determines whether the image of the third page includes the code image 60. Like the first page, the third page has one code image 60 in the upper left. The detector 310 determines that the image of the third page includes the code image 60. The detector 310 further detects the number of code images 60, and the position of each code image 60.

In this example, the number of code images 60 detected in the image of the first page matches the number of code images 60 detected in the image of the third page.

In addition, the position of each code image 60 detected in the image of the first page matches the position of each code image 60 detected in the image of the third page.

In this case in the exemplary embodiment, the setter 320 performs setting to make the scanning area (the scanning area to be scanned by the detector 310 for the code image 60) smaller. More specifically, the setter 320 changes the scanning area from the whole page (entirety) to an area smaller than the whole page.

More specifically, the scanning area to be scanned by the detector 310 on the first to third pages is the whole page in the exemplary embodiment. In the exemplary embodiment, it is determined on the third page that the position and number of code images 60 on the first page match the position and number of code images 60 on the third page (it is determined that the number and position of the two code images 60 match).

In this case in the exemplary embodiment, the setter 320 changes the scanning area on the fourth page onward to an area smaller than the whole page. Specifically, an area indicated by reference numeral 3A is set as a new scanning area on the fourth page onward.

With the process according to the exemplary embodiment, image scanning may be completed in a shorter period of time on the fourth page onward, compared with the case of scanning the whole page without any exception.

Further in the exemplary embodiment, failures in detecting the code image 60 are less likely to occur since the scanning area is narrowed down after two code images 60 are detected.

When two code images 60 are detected, if the positions of the two code images 60 are different, the document may include multiple types of code image added paper. In such a case, if the scanning area is narrowed down, failures in detecting the code image 60 become more likely to occur.

In contrast, if the positions of the two code images 60 are aligned as in the exemplary embodiment, conceivably the document includes a small number of types of code image added paper. Even when the scanning area is narrowed down, failures in detecting the code image 60 become less likely to occur.

The setter 320 additionally sets a position different from the position at which the two code images 60 are detected (hereinafter referred to as a "code image detection position") as a scanning area.

Specifically, the page center serves as a point of symmetry, and an area including a position symmetric about that point with the code image detection position is set as a scanning area.

Specifically, an area indicated by reference numeral 3B on each of the fourth to ninth pages is set as a scanning area. With reference to the third page, a portion indicated by reference numeral 3C serves as the code image detection position. Not only the code image detection position indicated by reference numeral 3C, but also a portion indicated by reference numeral 3B is set as a scanning area.

A position indicated by reference numeral 3D on the third page is a position symmetric about the page center with the code image detection position. The scanning area indicated by reference numeral 3B is set to include the position indicated by reference numeral 3D.

In other words in the exemplary embodiment, a scanning area is set to include a portion where there is the code image detection position when the page is rotated 180 degrees.

In doing so in the exemplary embodiment, when the scanner device 110 reads the document while the code image added paper is placed upside down and when this code image added paper is positioned at the fourth page onward, the code image 60 on this code image added paper is detectable.

More specifically, a document set to the scanner device 110 illustrated in FIG. 1 may have some code image added paper placed upside down.

In this case, if the area indicated by reference numeral 3A in FIG. 4 is the only scanning area, it becomes difficult to detect the code image 60 on the code image added paper which is placed upside down.

Like the exemplary embodiment, when a scanning area is set to additionally include a position symmetric about the page center with the code image detection position, the code image 60 is detectable on the code image added paper which is placed upside down.

In other words, an area (scanning area indicated by reference numeral 3B) including a position that is different from the position of the scanning area indicated by reference numeral 3A and that is symmetric about the page center with that scanning area is additionally set as a scanning area in the exemplary embodiment. In doing so, the code image 60 is detectable on code image added paper that is placed upside down.

On the fourth page onward, instead of scanning the whole page, only part of each page is scanned in the exemplary embodiment. In other words in the exemplary embodiment, the whole page is scanned up to the third page, and only part of each page is scanned from the fourth page onward. An area smaller than the scanning area on each of the first to third pages is scanned on the fourth page onward.

Further in the exemplary embodiment, when the position of the code image 60 detected on one page matches the position of the code image 60 detected on another page, the scanning area on each of subsequent pages following this other page is made smaller, compared with the case where the two positions are not aligned.

In doing so, detection of the code image 60 may be performed more quickly in the exemplary embodiment, compared with the case of uniformly scanning the whole page of each page.

Although the scanning area is made smaller when the position of the first code image 60 matches the position of the second code image 60 in the above-described case, even if the position of the first code image 60 is not aligned with the position of the second code image 60, the scanning area is made smaller when the amount of misalignment is less than a predetermined amount of misalignment.

Figure 5:
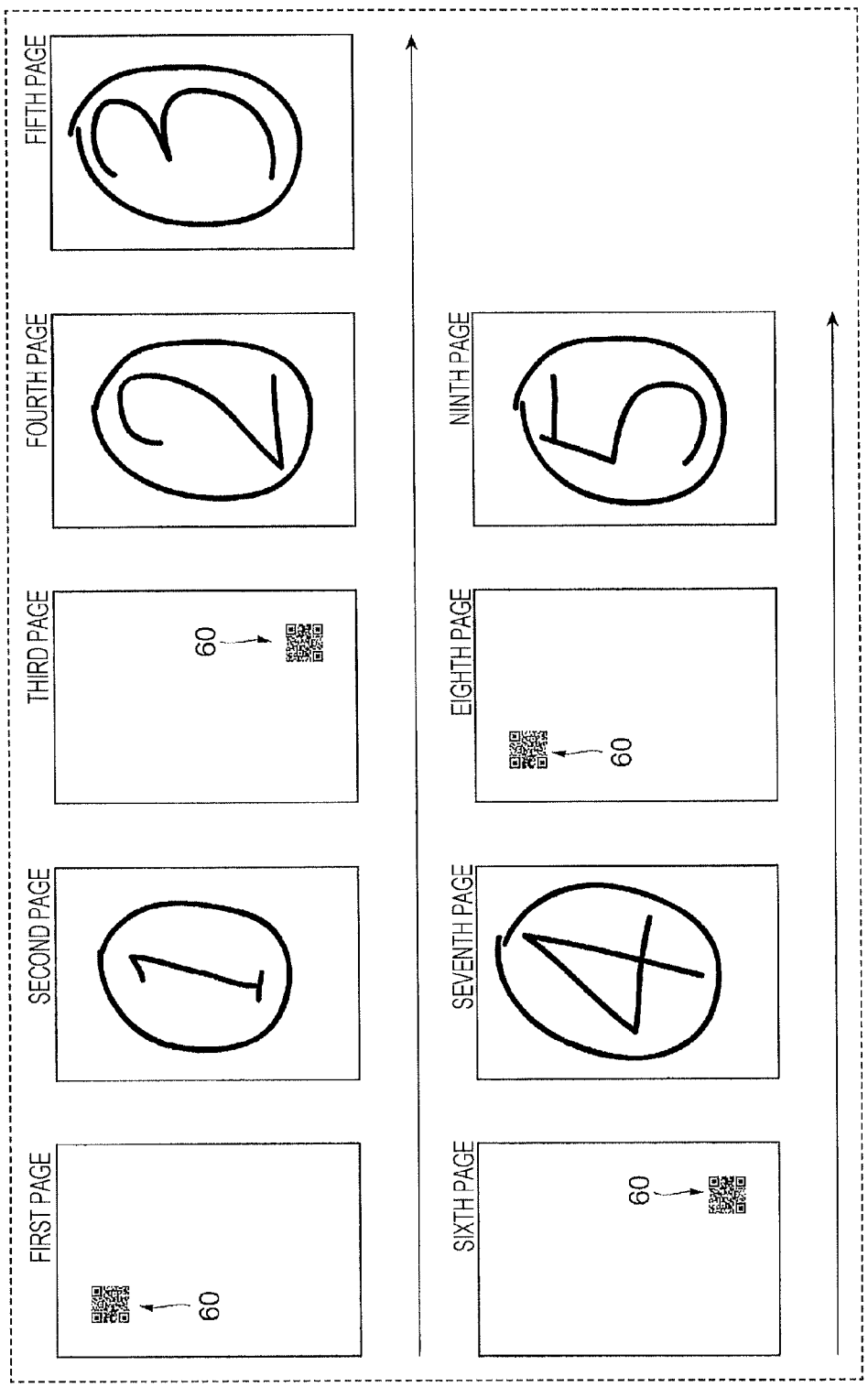
FIG. 5 is a diagram illustrating another exemplary process executed with regard to image scanning.

FIG. 5 is a diagram illustrating another exemplary process executed with regard to image scanning.

In this example, the position of the code image 60 on the third page is different from the position of the code image 60 illustrated in FIG. 4. In this example, the third page, which is the code image added paper, is placed upside down, and the position of the code image 60 on the first page is different from the position of the code image 60 on the third page.

However, in the process illustrated in FIG. 5, the detector 310 determines that the position of the code image 60 on the first page matches the position of the code image 60 on the third page.

In this process, three out of four corners of the code image 60 are each provided with a cutout symbol (square). The direction of the code image 60 is detectable by detecting the cutout symbols. In doing so, the direction of the document (whether the document is placed upside down) is also detectable in the exemplary embodiment.

In the process according to the exemplary embodiment, upon detection of the code image 60, the direction of the page is detected on the basis of the code image 60. In the exemplary embodiment, when the page is placed upside down, instead of being right side up, the position of the code image 60 is detected after taking into consideration the fact that the page is placed upside down.

In the example illustrated in FIG. 5, the third page is placed upside down. The position of the code image 60 on the third page is detected after taking into consideration the fact that the third page is placed upside down. Then, the position of the code image 60 on the third page is compared with the position of the code image 60 on the first page.

In the example illustrated in FIG. 5, it is determined that the position of the code image 60 on the third page matches the position of the code image 60 on the first page. The scanning area is narrowed down from the fourth page onward, as described above.

Figure 6:
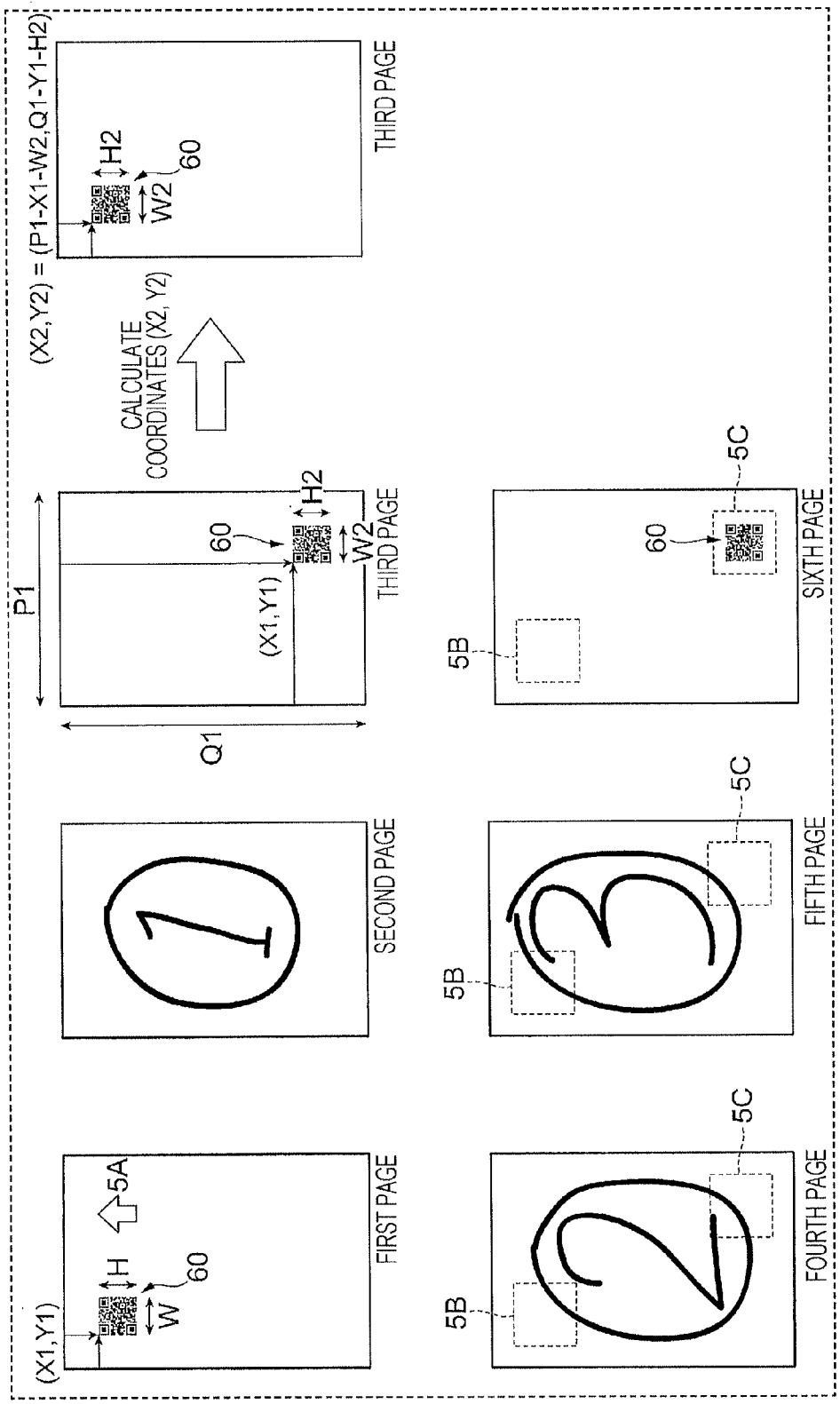
FIG. 6 is a diagram illustrating a specific example of a code image detecting process.

Referring to FIG. 6 (a diagram illustrating a specific example of a code image detecting process), the process illustrated in FIGS. 4 and 5 will be described in more detail.

In the exemplary embodiment, there is a code image 60 on the first page, and this code image 60 is detected. Upon detection of the code image 60, the number of code images 60 is detected, as described above. In addition, the position of each code image 60, and the size of each code image 60 are also detected.

Specifically, to detect the position of each code image 60, the coordinates (X1, Y1) of the code image 60 are detected with reference to the origin, which is the upper left-hand corner of the code image added paper. To detect the size of each code image 60, the height and width (H, W) of the code image 60 are detected.

The direction of each code image 60 is detected on the basis of the above-described cutout symbols, and the direction of the code image added paper is detected. An image of the first page in FIG. 6 is an image of the code image added paper placed right side up, and the direction indicated by arrow 5A is the direction where the upper portion of the code image added paper is positioned.

Next, in the exemplary embodiment, the detector 310 scans an image of the second page, and determines whether the image of the second page includes the code image 60. In this example, the second page includes no code image 60, and accordingly no detection of the code image 60 is performed on the second page.

On the third page, one code image 60 is positioned in the lower right-hand corner of the image. The detector 310 detects this code image 60, and also detects that the number of code images 60 is one. The detector 310 also detects the direction of the code image 60 on the basis of the above-described cutout symbols, and detects the direction of the document. In this example, the code image 60 is placed upside down, and accordingly it is determined that the code image added paper is placed upside down.

In this case in the exemplary embodiment, the position of the code image 60 is detected, assuming that the image of the third page were placed right side up.

Specifically on the third page, like the above-described case, when the upper left-hand corner of the code image added paper serves as the origin, the coordinates (X1, Y1) of the code image 60 are detected. Next, the coordinates (X1, Y1) are converted to coordinates (X2, Y2) assuming that the image were placed right side up. In the exemplary embodiment, like the above-described case, the height and width (H2, W2) of the code image 60 are detected.

Conversion of the coordinates (X1, Y1) to the coordinates (X2, Y2) is performed using the following conversion equation (1):

$$(X2, Y2) = (P1 - X1 - W2, Q1 - Y1 - H2) \quad (1)$$

where P1 is the width of the code image added paper, and Q1 is the height of the code image added paper.

Thereafter in the exemplary embodiment, the setter 320 determines whether the number of code images 60 detected on the first page matches the number of code images 60 detected on the third page. In this example, the number of code images 60 detected on the first page and the number of code images 60 detected on the third page are both "1", and accordingly it is determined that the numbers of code images 60 match.

Next in the exemplary embodiment, it is determined whether the position (X1, Y1) of the first code image 60 matches the position (X2, Y2) of the second code image 60, on the basis of the position of the first code image 60 and the position of the second code image 60.

Specifically, it is determined whether the absolute value of the difference between X1 and X2 is less than a predetermined value (such as 1 cm), and whether the absolute value of the difference between Y1 and Y2 is less than a predetermined value (such as 1 cm). When both differences are less than the respective predetermined values, it is determined that the position of the first code image 60 matches the position of the second code image 60.

When the positions of the two code image 60 match, the scanning area is made smaller in the exemplary embodiment, like the above-described case.

Further in the exemplary embodiment, when the image of the third page including the second code image 60 is rotated to be aligned with the direction of the first page, the positions of the two code images 60, namely, the code image 60 on the first page and the code image 60 on the third page, match, or the amount of misalignment between the two code images 60 is less than a predetermined amount of misalignment. In this case, it is determined that the position of the first code image 60 matches the position of the second code image 60.

More specifically, when the positions of the two code images 60 match or the amount of misalignment between the two code images 60 is less than a predetermined amount of misalignment, and when the directions of the two code images 60 (whether they are placed right side up or upside down) are aligned, the setter 320 determines that the positions of the two code images 60 match, and sets an area smaller than the whole page as a scanning area on the subsequent pages.

In the exemplary embodiment, the whole page serves as the scanning area until two code images 60 are found. When two code images 60 are found and when their positions match, an area smaller than the whole page is set as a scanning area on the subsequent pages.

Specifically, an area that includes the position of the first code image 60 and the position of the second code image 60 and that is smaller than the whole page is set as a new scanning area.

Although a new scanning area is set on the basis of the position of the first code image 60 and the position of the second code image 60 (so as to include both of these positions) in the exemplary embodiment, a new scanning area may be set on the basis of only one of these two positions. For example, a new scanning area may be set on the basis of only the position of the first code image 60.

Further in the exemplary embodiment, like the above-described case, an area including a position symmetric about the page center with the code image detection position is also set as a scanning area, taking into consideration that each page may be placed upside down.

Accordingly in the exemplary embodiment, areas in the upper left and the lower right, indicated by reference numerals 5B and 5C in FIG. 6, are set as scanning areas from the fourth page onward. In this example, the code image 60 is detected on the sixth page.

Figure 7:
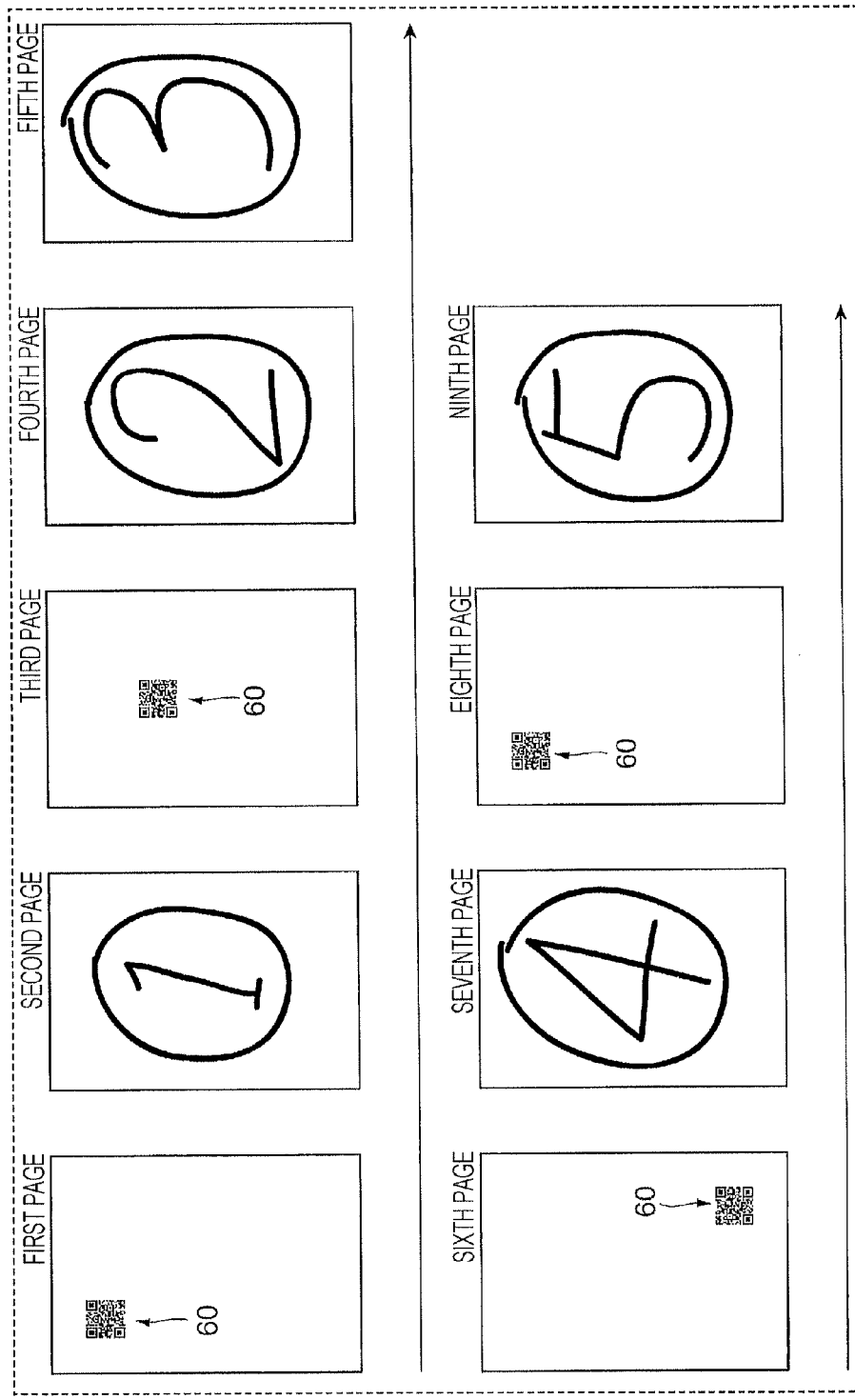
FIG. 7 is a diagram illustrating another exemplary process with regard to code image detection.

FIG. 7 is a diagram illustrating another exemplary process with regard to detection of the code image 60.

In this example, like the above-described case, there are code images 60 in the images of the first page and the third page. The code image 60 on the third page is positioned in a central portion of the page, which is different from the position of the code image 60 on the first page.

In such a case, the scanning area is not narrowed on each of pages from the fourth page onward, and the whole page is scanned.

When the positions of two code images 60 are different, it is more likely that the document includes multiple types of code image added paper having different positions for placing the code image 60. If the scanning area is narrowed, failures in detecting the code image 60 become more likely to occur.

Therefore, in the exemplary embodiment, when the positions of two detected code images 60 are different, the whole page is scanned, without narrowing down the scanning area.

Furthermore, for the same reason, when the number of code images 60 on a page where the first code image 60 is detected does not match the number of code images 60 on a page where the second code image 60 is detected, the whole page is scanned, without narrowing down the scanning area.

When the numbers of code images 60 do not match, it is more likely that the document includes multiple types of code image added paper. If the scanning area is narrowed, failures in detecting the code image 60 become more likely to occur.

Figure 8:
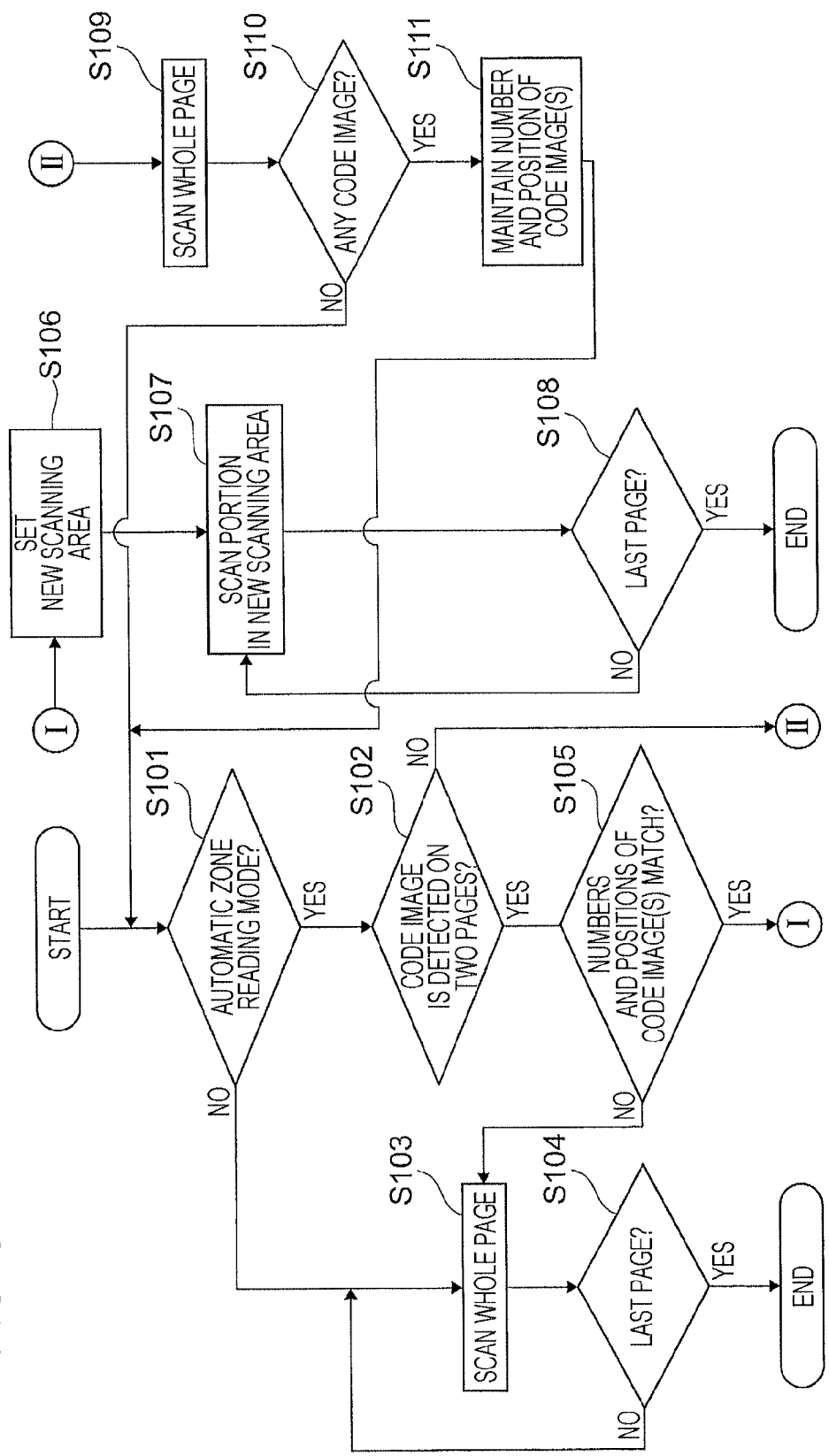
FIG. 8 is a flowchart illustrating the flow of a code image detecting process.

FIG. 8 is a flowchart illustrating the flow of a process of detecting the code image 60.

In the process according to the exemplary embodiment, the setter 320 first determines whether the current mode is an "automatic zone reading mode", which is a mode for performing processing to make the scanning area smaller, like the above-described case (step S101).

The automatic zone reading mode is set by the user through the display mechanism 200 (see FIG. 1), for example. When the automatic zone reading mode is currently set, the process proceeds to processing in step S102. When the automatic zone reading mode is not currently set, the process proceeds to processing in step S103.

When it is determined in step S101 that the current mode is not the automatic zone reading mode, the setter 320 sets the whole page as a scanning area. In step S103, the detector 310 performs scanning of the whole page, sequentially from the first page onward.

The detector 310 determines whether the scanned page is the last page (step S104). When the scanned page is the last page, the process ends. In contrast, when the scanned page is not the last page, the detector 310 scans the next page (scans the whole page) in step S103.

Meanwhile, when it is determined in step S101 that the current mode is the automatic zone reading mode, the detector 310 sequentially performs scanning from the first page onward.

At this time, the detector 310 scans the whole page. Whenever one page is completely scanned, the detector 310 determines whether the code image 60 is detected on two pages (step S102).

When the detector 310 determines that the code image 60 is detected on two pages, the detector 310 determines whether the number of code images 60 on one page matches the number of code images 60 on the other page, and whether the position of the code image 60 on one page matches the position of the code image 60 on the other page (step S105).

Like the above-described case, when a page where the code image 60 is detected is placed upside down, a position assuming that the page were placed right side up serves as the position of the code image 60.

When it is determined in step S105 that the numbers of code images 60 do not match and/or the positions of the code images 60 do not match, the setter 320 sets the scanning area on subsequent pages as the whole page. On the subsequent pages, the whole page is scanned (step S103). When the last page is completely scanned (when it is determined in step S104 that the scanned page is the last page), the whole process ends.

In contrast, when it is determined in step S105 that the numbers of code images 60 match and the positions of the code images 60 match, the setter 320 sets a new scanning area (step S106). Specifically, like the above-described case, the setter 320 sets an area smaller than the whole page as a new scanning area. On the subsequent pages, the detector 310 scans a portion in this new scanning area out of each page (step S107).

Next, whenever one page is completely scanned, the detector 310 determines whether this page is the last page (step S108). When the scanned page is the last page, the process ends. In contrast, when the scanned page is not the last page, the process returns to step S107, and the next page is scanned.

In contrast, when it is determined in step S102 that the code image 60 is not detected on two pages, the detector 310 scans the whole page when scanning each page (step S109). Whenever one page is completely scanned, the detector 310 determines whether the scanned page includes the code image (step S110).

When the scanned page includes the code image 60, the detector 310 detects the number of code images 60, the position of each code image 60, and the size (height, width) of each code image 60, and further maintains these items of information (step S111).

After the processing in step S111, the processing in step S101 is performed again in the exemplary embodiment. In step S111, when the code image added paper is placed upside down, information assuming that the paper were placed right side up is maintained, like the above-described case.

When it is determined in step S110 that the scanned page includes no code image 60, the next page is scanned. Specifically, when it is determined in step S110 that the scanned page includes no code image 60, the processing in steps S101, S102, and S109 is performed again, and the next page is scanned.

Another Exemplary Process

Figure 9:
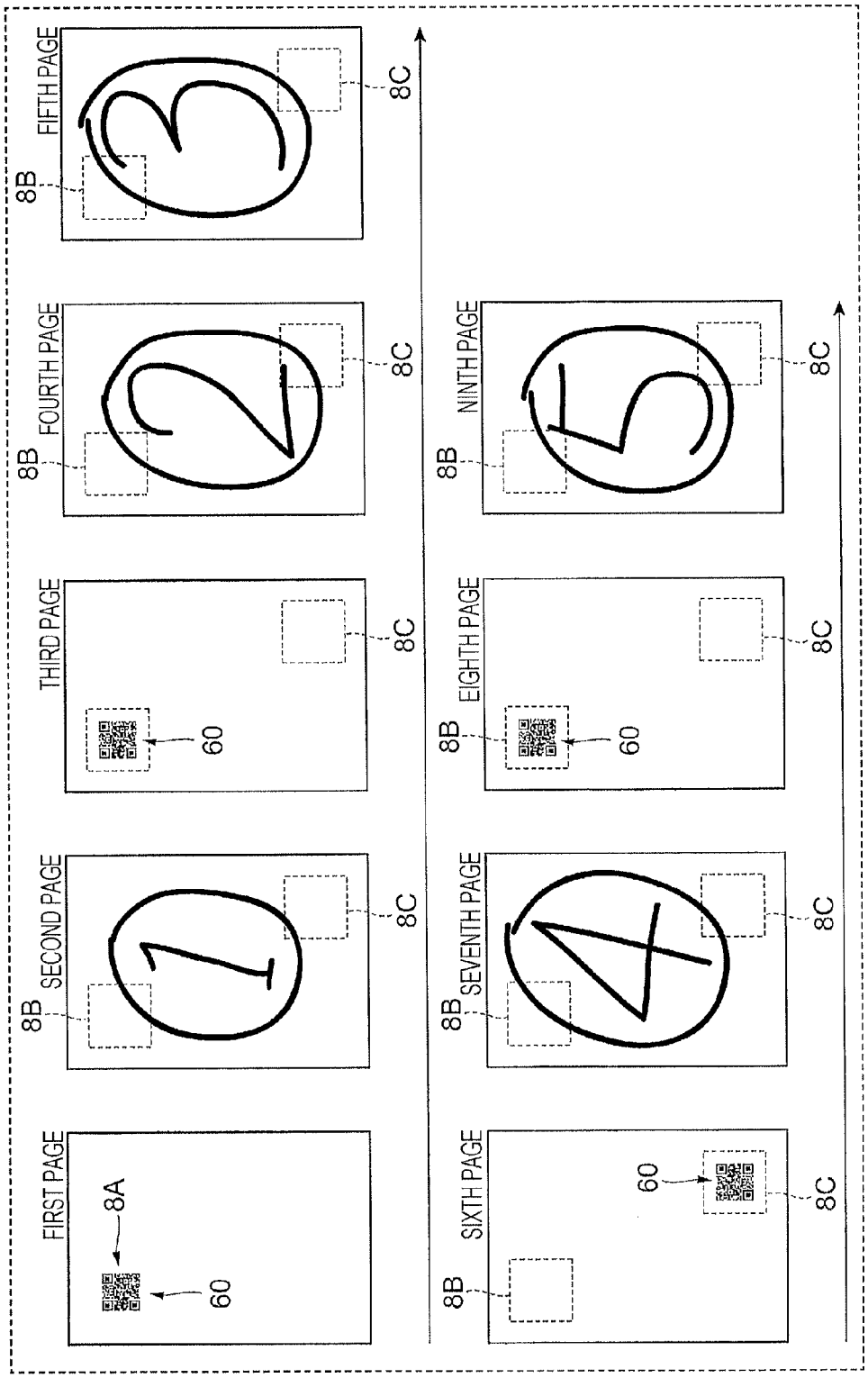
FIG. 9 is a diagram illustrating another exemplary process with regard to code image detection.

The above description has discussed the exemplary case of narrowing the scanning area after the code image 60 is detected on two pages. Alternatively, as illustrated in FIG. 9 (a diagram illustrating another exemplary process with regard to code image detection), the scanning area may be narrowed after one code image 60 is detected (after the code image 60 indicated by reference numeral 8A is detected). In this case, an area indicated by reference numeral 8B is set as a new scanning area.

In the case of this process, failures in detecting the code image 60 become more likely to occur, compared with the process discussed in the above-described case. Meanwhile, in the case of this process, a process of detecting the code image 60 may be completed in a shorter period of time, compared with the process discussed in the above-described case.

More specifically, the whole page is scanned until the code image 60 on the third page is detected (until the second code image 60 is detected) in the example illustrated in FIG. 4, whereas the whole page is scanned only on the first page in the example illustrated in FIG. 9. Accordingly, a process of detecting the code image 60 may be completed in a shorter period of time.

Like the above-described case, because there are cases where a page is placed upside down, it is preferable that not only an area including a code image detection position at which the code image 60 is detected, but also an area including a position that is point-symmetric with the code image detection position be additionally set as a scanning area. Specifically, it is preferable that an area indicated by reference numeral 8C in FIG. 9 be additionally set as a scanning area.

In the above-described case, the scanning area is narrowed down and made smaller in both the width and height directions of each page. Alternatively, the scanning area may be narrowed down only in one of the width and height directions.

More specifically, for example, while the whole area may be scanned in the width direction without narrowing down the scanning area in the width direction, the scanning area may be narrowed down in the height direction. In this case, a strip-shaped area extending in the width direction of each page is scanned. Alternatively, while the whole area may be scanned in the height direction, the scanning area may be narrowed down in the width direction. In this case, a strip-shaped area extending in the height direction of each page is scanned.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image scanning device comprising:
a processor that acts as:
a detector that scans an image in units of pages, and detects a code image included in the image in units of pages; and
a setter that sets, when the detector detects the code image on one page and then detects the code image on another page, a scanning area on a subsequent page following the other page in accordance with a position of the code image detected on the one page and a position of the code image detected on the other page,
wherein, when the position of the code image detected on the one page matches the position of the code image detected on the other page or when an amount of misalignment between the position of the code image detected on the one page and the position of the code image detected on the other page is less than a predetermined amount of misalignment, the processor acting as the setter sets an area that includes the position of the code image detected on the one page and the position of the code image detected on the other page and that is smaller than a whole page as a scanning area on the subsequent page.

2. The image scanning device according to claim 1, wherein the processor acting as the setter additionally sets an area that includes a position different from a position of the smaller area set as the scanning area on the subsequent page, and that includes a position symmetric about a page center with the smaller area as the scanning area.

3. The image scanning device according to claim 1, wherein, when the position of the code image detected on the one page does not match the position of the code image detected on the other page, the processor acting as the setter enlarges the scanning area on the subsequent page, compared with a case in which the position of the code image detected on the one page matches the position of the code image detected on the other page.

4. The image scanning device according to claim 1, wherein, when the position of the code image detected on the one page does not match the position of the code image detected on the other page, the processor acting as the setter sets a whole area of the subsequent page as the scanning area.

5. The image scanning device according to claim 1, wherein, in a case where a direction of the other page is aligned with a direction of the one page by rotating the other page, when positions of two code images, the two code images being the code image on the one page and the code image on the other page, match or when an amount of misalignment between the positions of the two code images is less than the predetermined amount of misalignment, and when directions of the two code images are aligned, the processor acting as the setter determines that the positions of the two code images match, and sets an area smaller than a whole page as a scanning area on the subsequent page.

6. The image scanning device according to claim 1, wherein, when a number of code images detected on the one page is different from a number of code images detected on the other page, the processor acting as the setter sets a whole area of the subsequent page as the scanning area.

7. An image scanning device comprising:
a processor that acts as:
a detector that scans an image in units of pages, and detects a code image included in the image in units of pages; and
a setter that sets, when the detector detects the code image on one page, a scanning area for scanning the code image on a subsequent page following the one page in accordance with a position at which the code image is detected,
wherein, when the code image is detected on the one page, the processor acting as the setter sets an area that includes the position at which the code image is detected and that is smaller than a whole page as a scanning area on the subsequent page, and
wherein the processor acting as the setter additionally sets an area that includes a position different from a code image detection position, the code image detection position being the position at which the code image is detected, and that is symmetric about a page center with the code image detection position as the scanning area.

8. The image scanning device according to claim 7, wherein the processor acting as the detector scans a whole area of each page until the code image is detected.

9. An image reading apparatus comprising:
an image reading unit that reads an image on a document; and
an image scanning device that scans the image obtained by the image reading unit,
wherein the image scanning device includes the image scanning device according to claim 1.

10. An image scanning method comprising:
scanning an image in units of pages, and detecting a code image included in the image in units of pages; and
when the code image is detected on one page and then on another page, setting a scanning area on a subsequent page following the other page in accordance with a position of the code image detected on the one page and a position of the code image detected on the other page,
wherein, when the position of the code image detected on the one page matches the position of the code image detected on the other page or when an amount of misalignment between the position of the code image detected on the one page and the position of the code image detected on the other page is less than a predetermined amount of misalignment, setting an area that includes the position of the code image detected on the one page and the position of the code image detected on the other page and that is smaller than a whole page as a scanning area on the subsequent page.

11. A non-transitory computer readable medium storing a program causing a computer to execute a process, the process comprising:
scanning an image in units of pages, and detecting a code image included in the image in units of pages; and
when the code image is detected on one page and then on another page, setting a scanning area on a subsequent page following the other page in accordance with a position of the code image detected on the one page and a position of the code image detected on the other page,
wherein, when the position of the code image detected on the one page matches the position of the code image detected on the other page or when an amount of misalignment between the position of the code image detected on the one page and the position of the code image detected on the other page is less than a predetermined amount of misalignment, setting an area that includes the position of the code image detected on the one page and the position of the code image detected on the other page and that is smaller than a whole page as a scanning area on the subsequent page.

12. A non-transitory computer readable medium storing a program causing a computer to execute a process, the process comprising:
   scanning an image in units of pages, and detecting a code image included in the image in units of pages; and
   when the code image is detected on one page, setting a scanning area for scanning the code image on a subsequent page following the one page in accordance with a position at which the code image is detected,
   wherein, when the code image is detected on the one page, setting an area that includes the position at which the code image is detected and that is smaller than a whole page as a scanning area on the subsequent page, and
   additionally setting an area that includes a position different from a code image detection position, the code image detection position being the position at which the code image is detected, and that is symmetric about a page center with the code image detection position as the scanning area.

* * * * *